United States Patent
Zhang et al.

(10) Patent No.: US 11,234,138 B2
(45) Date of Patent: Jan. 25, 2022

(54) DATA TRANSMISSION METHOD, TRANSMITTING DEVICE, AND RECEIVING DEVICE

(71) Applicant: HUAWEI TECHNOLOGIES CO., LTD., Guangdong (CN)

(72) Inventors: Leiming Zhang, Beijing (CN); Yifan Liu, Shenzhen (CN); Ming Lei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 136 days.

(21) Appl. No.: 16/455,999

(22) Filed: Jun. 28, 2019

(65) Prior Publication Data

US 2019/0320330 A1 Oct. 17, 2019

Related U.S. Application Data

(63) Continuation of application No. PCT/CN2017/118668, filed on Dec. 26, 2017.

(30) Foreign Application Priority Data

Dec. 30, 2016 (CN) .......................... 201611261964.7

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0695* (2013.01); *H04W 72/046* (2013.01); *H04W 80/08* (2013.01)

(58) Field of Classification Search
None
See application file for complete search history.

(56) References Cited

U.S. PATENT DOCUMENTS

| 8,743,728 | B2 * | 6/2014 | Okubo | .................. H04L 1/0007 370/252 |
| 2008/0090575 | A1 * | 4/2008 | Barak | .................. H04W 28/18 455/444 |

(Continued)

FOREIGN PATENT DOCUMENTS

| CN | 101505182 A | 8/2009 |
| CN | 104184561 A | 12/2014 |

(Continued)

OTHER PUBLICATIONS

3GPP TSG RAN WG1 #87, Samsung, "QCL relations for different types of RS." Reno, USA, Nov. 14-18, 2016.*

(Continued)

*Primary Examiner* — Andrew C Oh
(74) *Attorney, Agent, or Firm* — Fish & Richardson P.C.

(57) ABSTRACT

A data transmission method, a transmitting device, and a receiving device are disclosed. The method is applicable to a wireless communications system including a plurality of beams, and includes: determining, by a transmitting device, beam indication information and at least one transmit beam used for sending data to a receiving device; sending, by the transmitting device, the beam indication information to the receiving device; and transmitting, by the transmitting device, the data by using the at least one transmit beam. The transmitting device sends the beam indication information to indicate, to the receiving device, a corresponding receive beam used for receiving the data transmitted by the transmitting device.

12 Claims, 6 Drawing Sheets

(51) Int. Cl.
*H04W 72/04* (2009.01)
*H04W 80/08* (2009.01)

(56) References Cited

U.S. PATENT DOCUMENTS

| | | | |
|---|---|---|---|
| 2008/0212700 A1* | 9/2008 | Han | H04L 1/0625 375/260 |
| 2010/0075706 A1* | 3/2010 | Montojo | H04B 7/0691 455/513 |
| 2011/0143807 A1 | 6/2011 | Aue et al. | |
| 2011/0170625 A1* | 7/2011 | Blankenship | H04B 7/0456 375/295 |
| 2011/0243007 A1* | 10/2011 | Xiao | H04W 52/52 370/252 |
| 2012/0028628 A1* | 2/2012 | Frenger | H04B 7/0417 455/422.1 |
| 2012/0182951 A1* | 7/2012 | Okubo | H04W 64/00 370/329 |
| 2012/0307648 A1* | 12/2012 | Okubo | H04W 72/06 370/241 |
| 2013/0059595 A1* | 3/2013 | Okubo | H04W 72/1242 455/452.1 |
| 2013/0128761 A1* | 5/2013 | Kang | H04W 72/046 370/252 |
| 2013/0176952 A1* | 7/2013 | Shin | H04W 72/042 370/329 |
| 2013/0235819 A1* | 9/2013 | Zhang | H04W 72/04 370/329 |
| 2013/0336176 A1* | 12/2013 | Rubin | H04B 7/26 370/280 |
| 2014/0135061 A1* | 5/2014 | Rousu | H04B 1/18 455/553.1 |
| 2014/0334440 A1* | 11/2014 | Wong | H04J 11/005 370/331 |
| 2016/0029395 A1* | 1/2016 | Kim | H04L 5/0055 370/329 |
| 2017/0264355 A1* | 9/2017 | Zhang | H04W 72/082 |
| 2018/0132227 A1* | 5/2018 | Ghosh | H04B 7/0697 |
| 2018/0167174 A1 | 6/2018 | Lu et al. | |
| 2018/0219605 A1* | 8/2018 | Davydov | H04B 7/088 |
| 2018/0309484 A1* | 10/2018 | Nagata | H04B 7/0695 |
| 2018/0309496 A1* | 10/2018 | Lee | H04L 5/0053 |
| 2018/0323830 A1* | 11/2018 | Park | H04B 7/024 |
| 2019/0013916 A1* | 1/2019 | Jin | H04L 1/16 |
| 2019/0058558 A1* | 2/2019 | Lee | H04L 5/0007 |
| 2019/0149276 A1* | 5/2019 | Xiong | H04L 5/0048 370/329 |
| 2019/0253108 A1* | 8/2019 | Zhang | H04B 7/0404 |
| 2019/0387501 A1* | 12/2019 | Park | H04L 5/005 |

FOREIGN PATENT DOCUMENTS

| | | | |
|---|---|---|---|
| EP | 2945414 | * | 11/2015 |
| EP | 2945414 A1 | | 11/2015 |
| JP | 2014158106 A | | 8/2014 |
| JP | 2014526837 A | | 10/2014 |
| JP | 2016506112 A | | 2/2016 |
| JP | 2016521026 A | | 7/2016 |
| JP | 2016532365 A | | 10/2016 |
| WO | 2016197660 A1 | | 12/2016 |

OTHER PUBLICATIONS

"5G/NR—Beam Management." ShareTechnote, Nov. 7, 2016, www.sharetechnote.com/html/5G/5G_Phy_BeamManagement.html.*
Office Action issued in Japanese Application No. 2019-535347 dated Sep. 1, 2020, 6 pages (with English translation).
R1-1612492—Samsung, "QCL relations for different types of RS," 3GPP TSG RAN WG1 #87, Reno, USA, Nov. 14-18, 2016, 6 pages.
R1-1611385—CATT, "Discussion on beam reporting," 3GPP TSG RAN WG1 Meeting #87, Reno, USA, Nov. 14-18, 2016, 4 pages.
3GPP TS 36.212 V14.0.0 (Sep. 2016), "3rd Generation Partnership Project; Technical Specification Group Radio Access Network; Evolved Universal Terrestrial Radio Access (E-UTRA); Multiplexing and channel coding (Release 14)," Technical Specification, Sep. 2016, 148 pages.
R1-1613106—ZTE et al., "Multi-TRP transmission for NR," 3GPP TSG RAN WG1 Meeting #87, Reno, USA, Nov. 14-18, 2016, 6 pages.
PCT International Search Report and Written Opinion issued in International Application No. PCT/CN2017/118668 dated Feb. 26, 2018, 10 pages (with English translation).
Extended European Search Report issued in European Application No. 17887884.9 dated Aug. 16, 2019, 13 pages.
CATT, "Beamforming for data and control channel," 3GPP TSG RAN WG1 Meeting #87, R1-1611386, Reno, USA Nov. 14-18, 2016, 4 pages.
EPO Communication pursuant to Article 94(3) EPC issued in European Application No. 17887884.9 dated Apr. 7, 2021, 9 pages.
3GPP TS 36.211 V14.0.0 (Sep. 2016), "3rd Generation Partnership Project; Technical Specification Group Radio Access Network; Evolved Universal Terrestrial Radio Access (E-UTRA); Physical channels and modulation (Release 14)," Sep. 2016, 69 pages.
Office Action issued in Korean Application No. 2019-7021599 dated Jan. 24, 2021, 9 pages (with English translation).

* cited by examiner

DATA TRANSMISSION METHOD, TRANSMITTING DEVICE, AND RECEIVING DEVICE

CROSS-REFERENCE TO RELATED APPLICATIONS

This application is a continuation of International Application No. PCT/CN2017/118668, filed on Dec. 26, 2017, which claims priority to Chinese Patent Application No. 201611261964.7, filed on Dec. 30, 2016. The disclosures of the aforementioned applications are hereby incorporated by reference in their entireties.

TECHNICAL FIELD

Embodiments of the present invention relate to the field of wireless communications technologies, and in particular, to a data transmission method, a transmitting device, and a receiving device.

BACKGROUND

In an LTE system, to increase a throughput of an edge user, a coordinated multipoint transmission technology is introduced, including multipoint transmission. A typical technology of multipoint transmission includes a joint transmission technology. Being restricted by a capacity and a speed of information exchange between cells, the multipoint transmission technology, especially the joint transmission technology, is not optimized. In a $5^{th}$ generation new radio (5G NR) system, as a capability of information exchange between cells is improved (for example, an over-the-air (OTA) technology), the joint transmission technology needs to be further optimized. According to the joint transmission technology, a plurality of base stations or stations of data flows from different directions for the multi-beam transmission scenario.

SUMMARY

Embodiments of the present invention provide a data transmission method, a transmitting device, and a receiving device, to improve a capability of a terminal of receiving data from a plurality of beam directions in a 5G NR scenario.

According to a first aspect, a data transmission method is provided.

The data transmission method is applicable to a wireless communications system including a plurality of beams, and includes: determining, by a transmitting device, beam indication information and at least one transmit beam used for sending data to a receiving device; sending, by the transmitting device, the beam indication information to the receiving device; and transmitting, by the transmitting device, the data by using the at least one transmit beam.

The transmitting device sends the beam indication information to indicate, to the receiving device, a corresponding receive beam used for receiving the data transmitted by the transmitting device, so that the receiving device can select a suitable receive beam to receive the data, thereby improving a signal to interference plus noise ratio of receiving.

With reference to the first aspect, in a first possible implementation of the first aspect, the beam indication information indicates, to the receiving device, each receive beam used for receiving the data.

The transmitting device sends the beam indication information to indicate, to the receiving device, each receive beam used for receiving the data, so that the receiving device can select a suitable receive beam to receive the data, thereby improving a signal to interference plus noise ratio of receiving.

With reference to the first aspect or the first possible implementation of the first aspect, in a second possible implementation of the first aspect, the beam indication information includes information about each receive beam or information about each transmit beam.

The information about the receive beam may enable the receiving device to directly know the receive beam used for receiving the data, and the information about the transmit beam may enable the receiving device to indirectly know the receive beam used for receiving the data.

With reference to the first aspect, in a third possible implementation of the first aspect, the beam indication information is of a single-layer signaling structure or double-layer signaling structure.

The single-layer signaling structure includes physical layer indication signaling used for indicating an index value of the transmit beam or the receive beam. The double-layer signaling structure includes data link layer indication signaling and physical layer indication signaling. The data link layer indication signaling is used for indicating a beam set used by the transmitting device, and the physical layer indication signaling is used for indicating a beam in the beam set used by the transmitting device.

The beam indication information is sent by using the signaling of different structures, so that the beam indication information may be dynamically indicated to the receiving device.

With reference to any one of the first aspect, or the first possible implementation to the third possible implementation of the first aspect, in a fourth possible implementation of the first aspect, the sending, by the transmitting device, the beam indication information to the receiving device includes: sending, by the transmitting device, quasi co-location (QCL) information to the receiving device.

With reference to any one of the first aspect, or the first possible implementation to the fourth possible implementation of the first aspect, in a fifth possible implementation of the first aspect, after the determining, by a transmitting device, beam indication information, the method further includes: determining, by the transmitting device, a correspondence between the transmit beam and/or the receive beam and a transport layer. The sending, by the transmitting device, the beam indication information to the receiving device includes: sending, by the transmitting device, the beam indication information and the correspondence to the receiving device.

The transmitting device sends the beam indication information and the correspondence between a transmit beam and/or a receive beam and a transport layer to indicate, to the receiving device, a corresponding receive beam used for receiving the data transmitted by the transmitting device, and indicate a corresponding transport stream received by each receive beam to the receiving device, so that the receiving device may distinguish between power strength of data signals received by using the receive beams, and the receiving device uses a power difference between transport layers to eliminate signal interference. This increases a capability of the receiving device of receiving data from a plurality of beam directions, thereby increasing a signal-to-noise ratio of signal receiving of the receiving device.

With reference to the first aspect or the fifth possible implementation of the first aspect, in a sixth possible implementation of the first aspect, the sending, by the transmitting device, the beam indication information and the correspondence between the transmit beam and/or the receive beam and a transport layer to the receiving device includes: sending, by the transmitting device, the beam indication information and the correspondence between the transmit beam and/or the receive beam and a transport layer to the receiving device by using physical layer indication signaling.

With reference to the first aspect or the fifth possible implementation of the first aspect, in a seventh possible implementation of the first aspect, the determining, by the transmitting device, a correspondence between the transmit beam and/or the receive beam and a transport layer includes: determining, by the transmitting device, a correspondence between the transmit beam and/or the receive beam and a code word; and determining, by the transmitting device, a mapping relationship between the code word and the transport layer. The sending, by the transmitting device, the beam indication information to the receiving device includes: sending, by the transmitting device, the beam indication information and the mapping relationship between the code word and the transport layer to the receiving device.

The transmitting device sends the beam indication information and the mapping relationship between the code word and the transport layer to indicate, to the receiving device, a corresponding receive beam used for receiving the data transmitted by the transmitting device, and indicate the transport layer corresponding to the code word, so that the receiving device further uses a power difference between transport layers to improve a capability of eliminating interference between a plurality of code words, thereby increasing a capability of the receiving device of receiving data from a plurality of beam directions.

With reference to the first aspect or the seventh possible implementation of the first aspect, in an eighth possible implementation of the first aspect, the sending, by the transmitting device, the beam indication information and the mapping relationship between the code word and the transport layer to the receiving device includes: sending, by the transmitting device, the beam indication information and the mapping relationship between the code word and the transport layer to the receiving device by using physical layer indication signaling, where information bits of a specified bit quantity are set in the physical layer indication signaling to indicate a quantity of transport layers to which the code word is mapped; or a specific information bit is set in the physical layer indication signaling to indicate an index value of a mapping combination of the code word and the transport layer.

The beam indication information and the mapping relationship between the code word and the transport layer are sent by using the physical layer indication signaling, so that the beam indication information may be dynamically indicated to the receiving device.

With reference to the first aspect or the eighth possible implementation of the first aspect, in a ninth possible implementation of the first aspect, the transmitting device determines the specified bit quantity based on a largest quantity of transport layers of the system; or the transmitting device determines the specified bit quantity based on a largest quantity of transport layers of each code word stipulated in a protocol.

According to a second aspect, a data transmission method is provided.

The data transmission method is applicable to a wireless communications system including a plurality of beams, and includes: receiving, by a receiving device, beam indication information from a transmitting device, determining, by the receiving device according to the beam indication information, at least one receive beam used for receiving data transmitted by the transmitting device; and receiving, by the receiving device by using the determined at least one receive beam, the data transmitted by the transmitting device.

The receiving device may determine, according to the beam indication information sent by the transmitting device, the receive beams used for receiving the data transmitted by the transmitting device, so that the receiving device may distinguish between power strength of data signals received by using the receive beams, and the receiving device uses a power difference between transport layers to eliminate signal interference. This increases a capability of the receiving device of receiving data from a plurality of beam directions, thereby increasing a signal-to-noise ratio of signal receiving of the receiving device.

With reference to the second aspect, in a first possible implementation of the second aspect, the beam indication information includes information about the at least one receive beam; and the determining, by the receiving device according to the beam indication information, at least one receive beam used for receiving data transmitted by the transmitting device includes: determining, by the receiving device based on the information about the at least one receive beam indicated by the beam indication information, the at least one receive beam used for receiving the data transmitted by the transmitting device.

With reference to the second aspect, in a second possible implementation of the second aspect, the beam indication information includes information about at least one transmit beam. The determining, by the receiving device according to the beam indication information, at least one receive beam used for receiving data transmitted by the transmitting device includes: determining, by the receiving device based on the information about the at least one transmit beam indicated by the beam indication information and a correspondence between a transmit beam and a receive beam, information about at least one receive beam corresponding to the information about the at least one transmit beam; and determining, by the receiving device based on the information about the at least one receive beam corresponding to the information about the at least one transmit beam, the at least one receive beam used for receiving the data transmitted by the transmitting device.

With reference to the second aspect, or the first possible implementation or the second possible implementation of the second aspect, in a third possible implementation of the second aspect, the receiving, by a receiving device, beam indication information from a transmitting device includes: receiving, by the receiving device, QCL information from the transmitting device; and determining, by the receiving device, the beam indication information based on a correspondence between the QCL information and the beam indication information.

With reference to any one of the second aspect, or the first possible implementation to the third possible implementation of the second aspect, in a fourth possible implementation of the second aspect, the receiving, by a receiving device, beam indication information from a transmitting device includes: receiving, by the receiving device, the beam indication information and a correspondence between a transmit beam and/or a receive beam and a transport layer from the transmitting device. The determining, by the receiving device according to the beam indication information, at least one receive beam used for receiving data transmitted by the transmitting device includes: determining, by the receiving device according to the beam indication information and the correspondence between a transmit beam and/or a receive beam and a transport layer, the at least one receive beam used for receiving the data transmitted by the transmitting device, and a transport stream that needs to be received by the at least one receive beam.

With reference to any one of the second aspect, or the first possible implementation to the third possible implementation of the second aspect, in a fifth possible implementation of the second aspect, the receiving, by a receiving device, beam indication information from a transmitting device includes: receiving, by the receiving device, the beam indication information and a mapping relationship between a code word and a transport layer from the transmitting device. The determining, by the receiving device according to the beam indication information, at least one receive beam used for receiving data transmitted by the transmitting device includes: determining, by the receiving device according to the beam indication information and the mapping relationship between the code word and the transport layer, the at least one receive beam used for receiving the data transmitted by the transmitting device, and a transport stream that needs to be received by the at least one receive beam.

With reference to the second aspect or the fifth possible implementation of the second aspect, in a sixth possible implementation of the second aspect, the receiving, by the receiving device, the beam indication information and a mapping relationship between a code word and a transport layer from the transmitting device includes: receiving, by the receiving device, the beam indication information and the mapping relationship between the code word and the transport layer from the transmitting device by using physical layer indication signaling, where information bits of a specified bit quantity are set in the physical layer indication signaling to indicate a quantity of transport layers to which the code word is mapped; or a specific information bit is set in the physical layer indication signaling to indicate an index value of a mapping combination of the code word and the transport layer.

With reference to the second aspect or the sixth possible implementation of the second aspect, in a seventh possible implementation of the second aspect, the method further includes: determining, by the receiving device based on a largest quantity of transport layers of the system and the information bits of the specified bit quantity, the quantity of transport layers to which the code word is mapped; or determining, by the receiving device based on the information bits of the specified bit quantity, a largest quantity of transport layers of each code word stipulated in a protocol; or determining, by the receiving device based on the specific information bit, the index value of the mapping combination of the code word and the transport layer.

According to a third aspect, a transmitting device is provided.

The transmitting device is applicable to a wireless communications system including a plurality of beams, and includes: a processing unit, configured to determine beam indication information and at least one transmit beam used for sending data to a receiving device; and a transceiver unit, configured to: send the beam indication information to the receiving device; and transmit the data by using the at least one transmit beam.

With reference to the third aspect, in a first possible implementation of the third aspect, the beam indication information indicates, to the receiving device, each receive beam used for receiving the data.

With reference to the third aspect or the first possible implementation of the third aspect, in a second possible implementation of the third aspect, the beam indication information includes information about each receive beam or information about each transmit beam.

With reference to any one of the third aspect, or first possible implementation or the second possible implementation of the third aspect, in a third possible implementation of the third aspect, the transceiver unit is specifically configured to send QCL information to the receiving device.

With reference to any one of the third aspect, or the first possible implementation to the third possible implementation of the third aspect, in a fourth possible implementation of the third aspect, the processing unit is further configured to: determine a correspondence between the transmit beam and/or the receive beam and a transport layer after determining the beam indication information. The transceiver unit is specifically configured to send the beam indication information and the correspondence to the receiving device.

With reference to the third aspect or the fourth possible implementation of the third aspect, in a fifth possible implementation of the third aspect, the processing unit is specifically configured to: determine a correspondence between the transmit beam and/or the receive beam and a code word; and determine a mapping relationship between the code word and the transport layer. The transceiver unit is specifically configured to send the beam indication information and the mapping relationship between the code word and the transport layer to the receiving device.

With reference to the third aspect or the fifth possible implementation of the third aspect, in a sixth possible implementation of the third aspect, the transceiver unit is specifically configured to send the beam indication information and the mapping relationship between the code word and the transport layer to the receiving device by using physical layer indication signaling, where information bits of a specified bit quantity are set in the physical layer indication signaling to indicate a quantity of transport layers to which the code word is mapped; or a specific information bit is set in the physical layer indication signaling to indicate an index value of a mapping combination of the code word and the transport layer.

With reference to the third aspect or the sixth possible implementation of the third aspect, in a seventh possible implementation of the third aspect, the processing unit is specifically configured to: determine the specified bit quantity based on a largest quantity of transport layers of the system; or determine the specified bit quantity based on a largest quantity of transport layers of each code word stipulated in a protocol.

According to a fourth aspect, a receiving device is provided.

The receiving device is applicable to a wireless communications system including a plurality of beams, and includes: a transceiver unit, configured to receive beam indication information from a transmitting device; and a processing unit, configured to determine, according to the beam indication information, at least one receive beam used for receiving data transmitted by the transmitting device, and the transceiver unit is further configured to receive, by using the determined at least one receive beam, the data transmitted by the transmitting device.

With reference to the fourth aspect, in a first possible implementation of the fourth aspect, the beam indication information includes information about the at least one receive beam; and the processing unit is specifically configured to: determine, based on the information about the at least one receive beam indicated by the beam indication information, the at least one receive beam used for receiving the data transmitted by the transmitting device.

With reference to the fourth aspect, in a second possible implementation of the fourth aspect, the beam indication information includes information about at least one transmit beam; and the processing unit is specifically configured to: determine, based on the information about the at least one transmit beam indicated by the beam indication information and a correspondence between a transmit beam and a receive beam, information about at least one receive beam corresponding to the information about the at least one transmit beam; and determine, based on the information about the at least one receive beam corresponding to the information about the at least one transmit beam, the at least one receive beam used for receiving the data transmitted by the transmitting device.

With reference to the fourth aspect, or the first possible implementation or the second possible implementation of the fourth aspect, in a third possible implementation of the fourth aspect, the transceiver unit is specifically configured to: receive QCL information from the transmitting device; and determine, by using the processing unit, the beam indication information based on a correspondence between the QCL information and the beam indication information.

With reference to any one of the fourth aspect, or the first possible implementation to the third possible implementation of the fourth aspect, in a fourth possible implementation of the fourth aspect, the transceiver unit is specifically configured to: receive the beam indication information and a correspondence between a transmit beam and/or a receive beam and a transport layer from the transmitting device. The processing unit is specifically configured to: determine, according to the beam indication information and the correspondence between a transmit beam and/or a receive beam and a transport layer, the at least one receive beam used for receiving the data transmitted by the transmitting device, and a transport stream that needs to be received by the at least one receive beam.

With reference to any one of the fourth aspect, or the first possible implementation to the third possible implementation of the fourth aspect, in a fifth possible implementation of the fourth aspect, the transceiver unit is specifically configured to: receive the beam indication information and a mapping relationship between a code word and a transport layer from the transmitting device. The processing unit is specifically configured to: determine, according to the beam indication information and the mapping relationship between the code word and the transport layer, the at least one receive beam used for receiving the data transmitted by the transmitting device, and a transport stream that needs to be received by the at least one receive beam.

With reference to the fourth aspect or the fifth possible implementation of the fourth aspect, in a sixth possible implementation of the fourth aspect, the transceiver unit is specifically configured to: receive the beam indication information and the mapping relationship between the code word and the transport layer from the transmitting device by using physical layer indication signaling, where information bits of a specified bit quantity are set in the physical layer indication signaling to indicate a quantity of transport layers to which the code word is mapped; or a specific information bit is set in the physical layer indication signaling to indicate an index value of a mapping combination of the code word and the transport layer.

With reference to the fourth aspect or the sixth possible implementation of the fourth aspect, in a seventh possible implementation of the fourth aspect, the processing unit is further configured to: determine, based on a largest quantity of transport layers of the system and the information bits of the specified bit quantity, the quantity of transport layers to which the code word is mapped; or determine, based on the information bits of the specified bit quantity, a largest quantity of transport layers of each code word stipulated in a protocol; or determine, based on the specific information bit, the index value of the mapping combination of the code word and the transport layer.

According to a fifth aspect, a transmitting device is provided, including a transceiver and a processor. The processor is configured to perform the method according to any one of the first aspect or the implementations of the first aspect.

According to a sixth aspect, a receiving device is provided, including a transceiver and a processor. The processor is configured to perform the method according to any one of the second aspect or the implementations of the second aspect.

According to a seventh aspect, a computer storage medium is provided, configured to store a computer software instruction executed by the processor provided in the fifth aspect, to perform the method according to the first aspect or the possible implementations of the first aspect.

According to an eighth aspect, a computer storage medium is provided, configured to store a computer software instruction executed by the processor provided in the sixth aspect, to perform the method according to the second aspect or the possible implementations of the second aspect.

DESCRIPTION OF EMBODIMENTS

To make the objectives, technical solutions, and advantages of the present invention clearer, the following further describes the present invention in detail with reference to the accompanying drawings.

Figure 1:
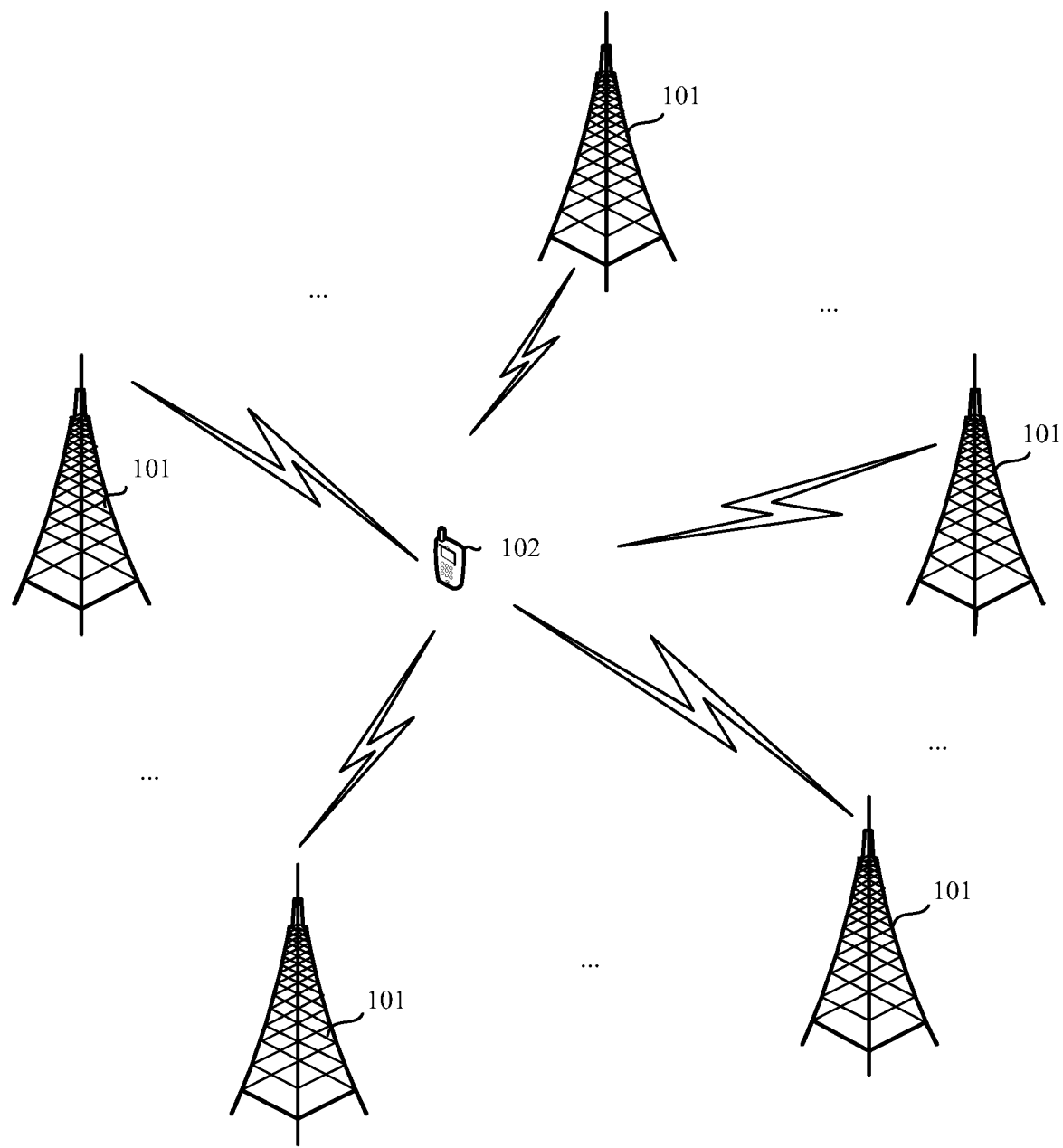
FIG. 1 is a schematic diagram of a system architecture according to an embodiment of the present invention.

FIG. 1 shows a system architecture to which an embodiment of the present invention is applicable. A data transmission procedure can be controlled based on the system architecture. The system architecture for data transmission provided in this embodiment of the present invention includes a plurality of transmitting devices 101 and a receiving device 102.

The transmitting devices 101 may be base stations or stations managed by base stations. The receiving device 102 may be a mobile terminal. In a wireless communications system including a plurality of beams, the plurality of transmitting devices 101 may send data to the receiving device 102 by using a joint transmission technology and a plurality of beams.

In this embodiment of the present invention, the plurality of beams may be a plurality of beams in one transmitting device 101, or may be a plurality of beams in a plurality of transmitting devices 101. For example, a first transmitting device 101 may use one beam, and a second transmitting device 101 may use two beams, and correspondingly, the receiving device 102 needs to use three beams to receive data transmitted by the two transmitting devices 101.

When the plurality of transmitting devices 101 use the joint transmission technology, a primary device of the plurality of transmitting devices 101 is responsible for allocating beams used for data transmission and notifying each transmitting device 101 of the beams, so that each transmitting device 101 knows beams that can be used by the transmitting device 101 for implementing data transmission.

Figure 2:
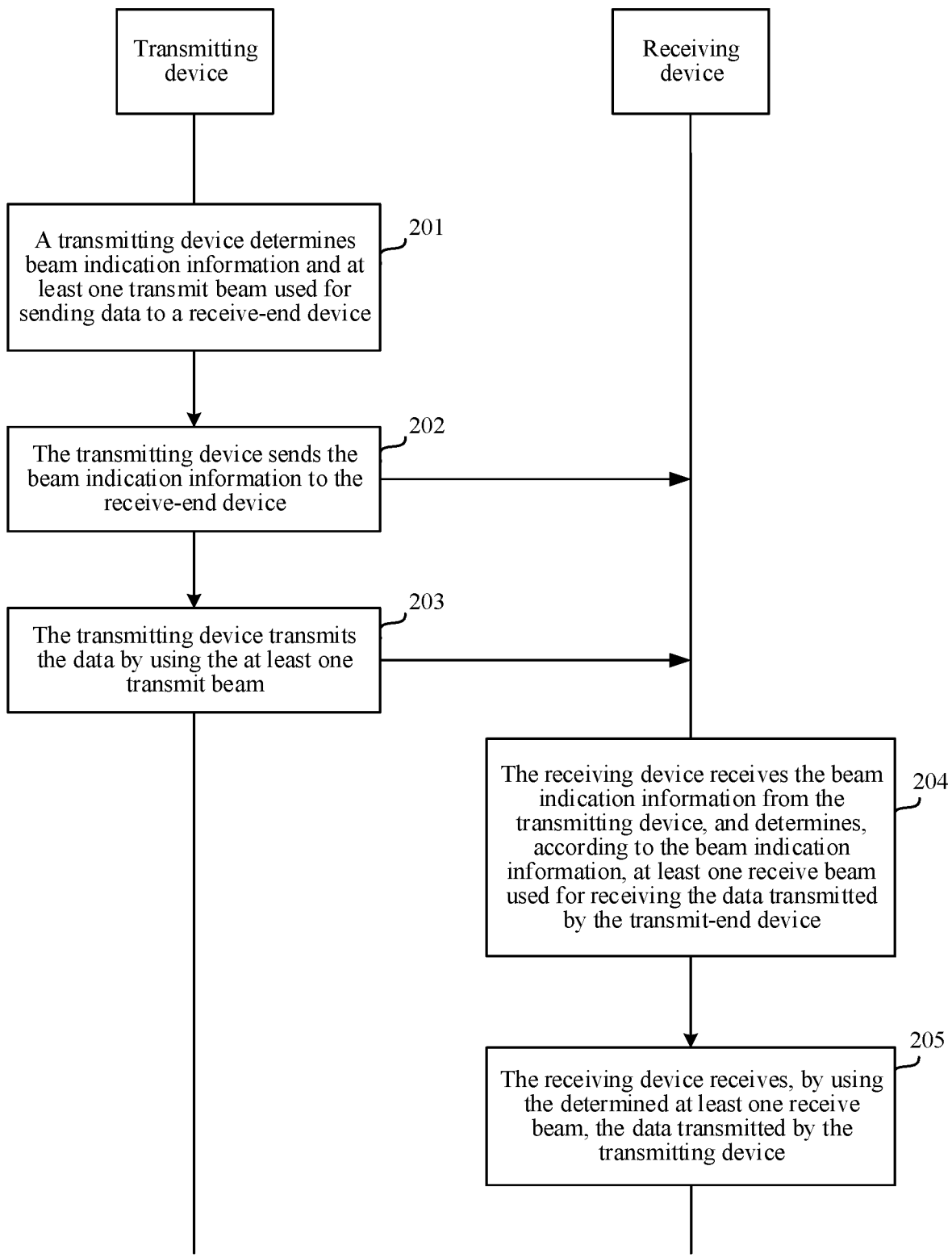
FIG. 2 is a data transmission method according to an embodiment of the present invention.

Based on the foregoing description, FIG. 2 shows an example of a procedure of a data transmission method according to an embodiment of the present invention. The procedure is applicable to a wireless communications system including a plurality of beams.

As shown in FIG. 2, the procedure includes the following specific steps.

Step 201: A transmitting device determines beam indication information and at least one transmit beam used for sending data to a receiving device.

Step 202: The transmitting device sends the beam indication information to the receiving device.

Step 203: The transmitting device transmits the data by using the at least one transmit beam.

Step 204: The receiving device receives the beam indication information from the transmitting device, and determines, according to the beam indication information, at least one receive beam used for receiving the data transmitted by the transmitting device.

Step 205: The receiving device receives, by using the determined at least one receive beam, the data transmitted by the transmitting device.

In this embodiment of the present invention, when transmitting the data to the receiving device, the transmitting device needs to first determine the at least one transmit beam used for sending the data to the receiving device. The at least one transmit beam that is used is determined by using an existing common technology. This is not further described in this embodiment of the present invention.

When the at least one transmit beam used for sending the data to the receiving device is determined, the beam indication information also needs to be determined. The beam indication information may indicate, to the receiving device, each receive beam used for receiving the data.

Specifically, the beam indication information may be information about each receive beam. The information about each receive beam may instruct the receiving device to determine each receive beam used for receiving the data. The beam indication information may alternatively be information about each transmit beam. The information about each transmit beam may instruct the receiving device to determine the receive beam used for receiving the data.

The information about each receive beam or the information about each transmit beam is indicated, so that the receiving device can know receive beams by using which power of a received data signal is strongest, and use an advantage of a great power difference to enhance iterative interference elimination, thereby increasing a capability of the receiving device of receiving data from a plurality of beam directions.

Optionally, the beam indication information may be of a single-layer signaling structure or double-layer signaling structure. When being of a single-layer signaling structure, the beam indication information may be physical layer indication signaling, and an index value of the transmit beam and/or the receive beam is indicated by using the physical layer indication signaling. When being of a double-layer signaling structure, the beam indication information may be a combination of data link layer indication signaling and physical layer indication signaling, a transmit beam set and/or receive beam set is indicated by using the data link layer indication signaling, and a transmit beam and/or receive beam in the transmit beam set or the receive beam set is indicated by using the physical layer indication signaling.

When the transmitting device determines the beam indication information, the transmitting device also needs to determine a correspondence between the transmit beam and/or the receive beam and a transport layer, so that the receiving device knows a transport layer received by using the receive beam when receiving data. The transmit beam and/or the receive beam may correspond to one or more transport layers. This is not limited in this embodiment of the present invention.

The transmitting device may send the beam indication information and the determined correspondence between the transmit beam and/or the receive beam and the transport layer to the receiving device. The transmitting device sends the beam indication information and the correspondence between the transmit beam and/or the receive beam and a transport layer to the receiving device by using physical layer indication signaling. The beam indication information and the determined correspondence between the transmit beam and/or the receive beam and the transport layer may be indicated in a same information field or two different information fields in one piece of signaling.

Figure 3:
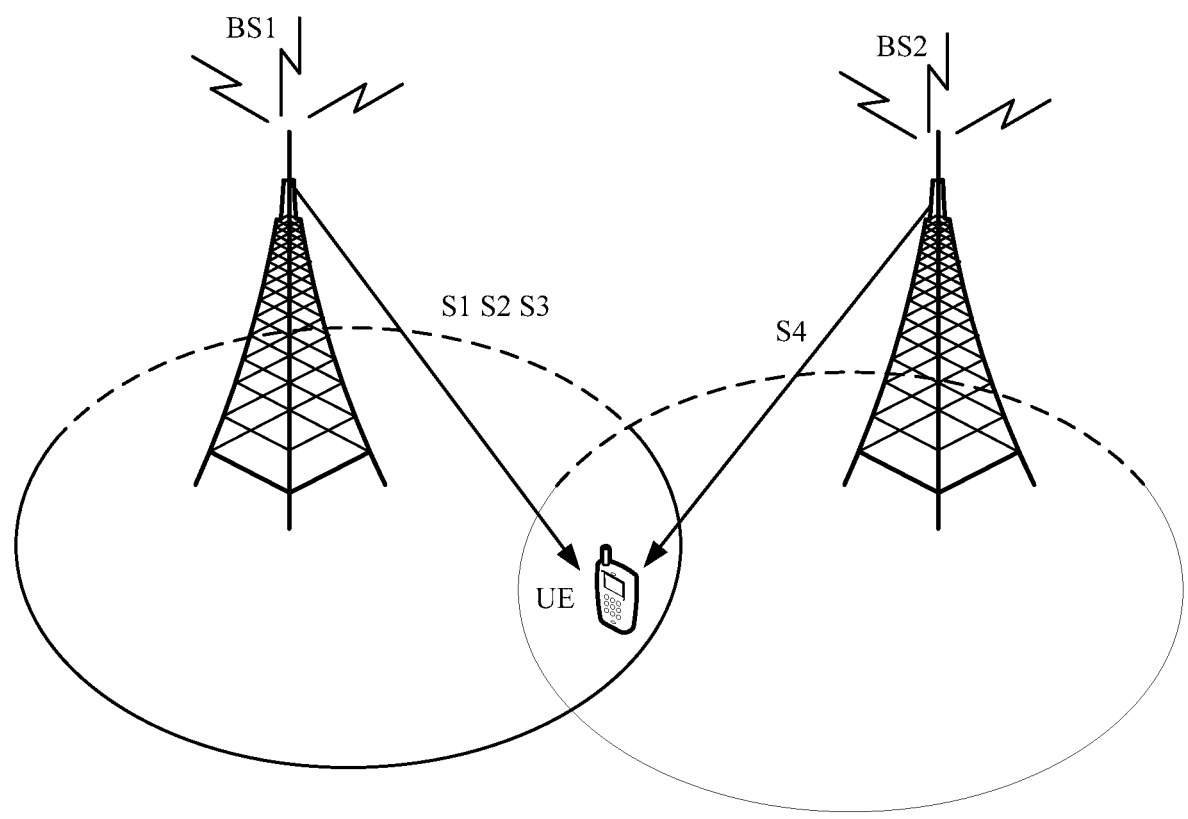
FIG. 3 is a schematic diagram of a scenario of multipoint joint transmission according to an embodiment of the present invention.

For example, in a multipoint joint transmission scenario in FIG. 3, a station BS1 and a station BS2 jointly transmit data to a terminal UE1. The station BS1 transmits data to the terminal UE1 by using a transmit beam 1, and the station BS2 transmits data to the terminal UE1 by using a transmit beam 2.

An indication manner may be as shown in Table 1 when the beam indication information and the correspondence between a transmit beam and/or a receive beam and a transport layer are in a same information field.

TABLE 1

| Receive beam 1 | Receive beam 1 | Receive beam 1 | Receive beam 2 |
| --- | --- | --- | --- |

That is, all transport layers received by receive beams are listed one by one.

A placement manner of the beam indication information in one information field may be as shown in Table 2 when the beam indication information and the correspondence between a transmit beam and/or a receive beam and a transport layer are in different information fields.

TABLE 2

| Receive beam 1 | Receive beam 2 |
|---|---|

In the information field, only a receive beam that is used is indicated, and a transport layer received by a receive beam is not indicated.

The correspondence between a transmit beam and/or a receive beam and a transport layer may be placed in another information field, and may be receive beam 1:3, indicating that the first three transport layers are all received by one receive beam. Receive beam 2:1 indicates that the fourth, that is, the $(3+1)^{th}$, transport layer is received by a receive beam 2.

Further, when determining the correspondence between a transmit beam and/or a receive beam and a transport layer, the transmitting device may first determine a correspondence between the transmit beam and/or the receive beam and a code word; determine a mapping relationship between the code word and the transport layer, and then send the beam indication information and the mapping relationship between the code word and the transport layer to the receiving device.

The transmitting device sends the beam indication information and the mapping relationship between the code word and the transport layer to indicate, to the receiving device, a corresponding receive beam used for receiving the data transmitted by the transmitting device, and indicate the transport layer corresponding to the code word, so that the receiving device further uses a power difference between transport layers to improve a capability of eliminating interference between a plurality of code words, thereby increasing a capability of the receiving device of receiving data from a plurality of beam directions.

In the scenario shown in FIG. 3, signals S1, S2, and S3 transmitted by the station BS1 correspond to a code word 1, and a signal S4 transmitted by the station BS2 corresponds to a code word 2. Information about a receive beam in each code word is indicated in each information field.

The beam indication information and the mapping relationship between the code word and the transport layer may be sent to the receiving device by using physical layer indication signaling, and information bits of a specified bit quantity are set in the physical layer indication signaling to indicate a quantity of transport layers to which the code word is mapped. Specifically, the transmitting device may determine the specified bit quantity based on a largest quantity of transport layers of the system.

For example, M is the largest quantity of transport layers of the current system, and the specified bit quantity is determined based on a value of M by using $\log_2(M)$, to indicate the quantity of transport layers to which each code word is mapped.

Alternatively, the specified bit quantity may be determined based on a largest quantity of transport layers of each code word stipulated in a protocol, to indicate the quantity of transport layers to which each code word is mapped. For example, one code word dynamically corresponds to one or two layers, so that each code word requires only one information bit to indicate the quantity of transport layers to which the code word is mapped.

Alternatively, a specific information bit may be set in the physical layer indication signaling to indicate an index value of a mapping combination of the code word and the transport layer. For example, when there are two code words and each code word is mapped to two transport layers at most, mapping combinations of the code words and the transport layers are respectively {1,1}, {1,2}, {2,1}, and {2,2}. Therefore, two specific information bits may be used to indicate the four cases. When a current mapping relationship between the code word and the transport layer is {1,2}, the specific information bit is 01.

By using the dynamic mapping technology of the code word and the transport layer, a case in which data from different beam directions corresponds to various transport layers of different code words may be flexibly supported.

Optionally, when sending the beam indication information to the receiving device, the transmitting device may implicitly indicate the beam indication information to the receiving device. Specifically, the transmitting device may send QCL information to the receiving device, and the receiving device may determine, based on a correspondence between the QCL information and the beam indication information, the receive beam used for receiving the data.

In the foregoing embodiments, the transmitting device sends the beam indication information to indicate, to the receiving device, a corresponding receive beam used for receiving the data transmitted by the transmitting device, so that the receiving device can select a suitable receive beam to receive the data, thereby improving a signal to interference plus noise ratio of receiving.

Based on the foregoing embodiments, the receiving device may identify, by using indicated receive beams, a receive beam having strong signal power. This mainly includes the following manners.

Manner 1: Indicate that different beam receiving directions correspond to different code words, and identify a code word having a high confidence level (higher receive power) in each beam direction and preferentially test the code word.

Manner 2: Indicate that different beam receiving directions correspond to different code words, and identify a code word having a high confidence level (higher receive power) in each beam direction and preferentially test the code word, and then test a code word having a low confidence level, and eliminate the code word having a high confidence level as interference.

Manner 3: Indicate that different beam receiving directions correspond to different code words, and identify a code word having a high confidence level (higher receive power) in each beam direction and preferentially test the code word, and then substitute a test result into another beam to eliminate the test result as interference, to further improve a test effect of a wanted signal.

Figure 4:
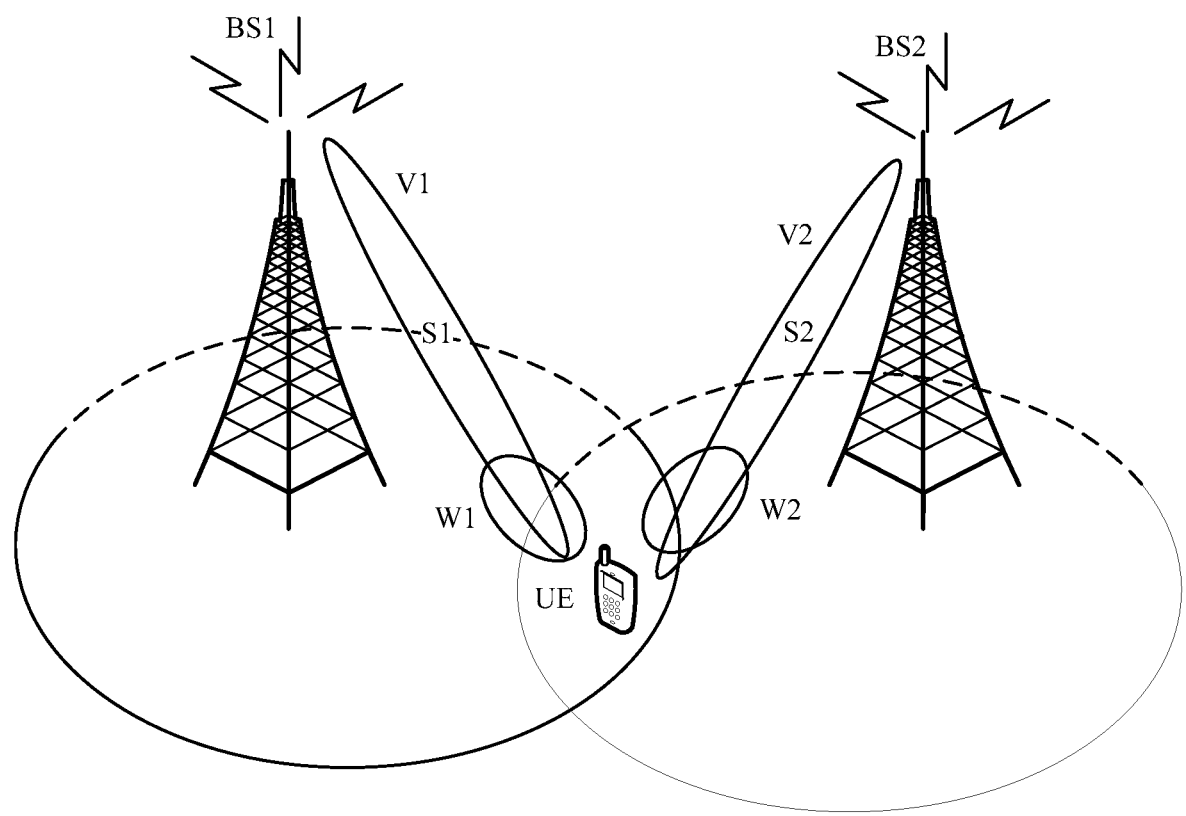
FIG. 4 is a schematic diagram of a scenario of multipoint joint transmission according to an embodiment of the present invention.

In a scenario in FIG. 4, a transmission model is $Y=H_1V_1 S_1+H_2V_2 S_2+\text{Inter}+\text{noise}$. In this case, the following manners may be used by the receiving device to perform signal test.

First, as shown in FIG. 4, according to the beam indication information, the receiving device uses a receive beam 1 to receive an S1, where an S2 is used as interference, and uses a receive beam 2 to receive the S2, where the S1 is used as interference.

Manner 1 is as follows:

According to the beam indication information, the receive beam 1 receives the S1, and the S1 is preferentially tested as a strong signal. Then, after the S1 is eliminated as known interference after being tested, the S2 is tested. Then, after the S2 is eliminated as interference, the S1 is tested again. Because the interference S2 is eliminated, a test correctness percentage of the S1 that is tested again is increased. The receive beam 2 receives the S2, and the S2 is preferentially tested as a strong signal. Then, after the S2 is eliminated as known interference after being tested, the S1 is tested. Then, after the S1 is eliminated as interference, the S2 is tested again. Because the interference S1 is eliminated, a test correctness percentage of the S2 that is tested again is increased.

Manner 2 is as follows:

According to the beam indication information, the receive beam 1 receives the S1 and an S1' is obtained by test; and the receive beam 2 receives the S2 and an S2' is obtained by test. The S2' is substituted into a receiving model of the receive beam 1 to be eliminated as interference, and then the S1 is tested. Likewise, the S1' is substituted into a receiving model of the receive beam 2 to be eliminated as interference, and then the S2 is tested.

Correspondingly, when receiving the beam indication information from the transmitting device, the receiving device needs to determine, according to the beam indication information, at least one receive beam used for receiving the data transmitted by the transmitting device. When the beam indication information includes information about the at least one receive beam, the receiving device determines, based on the information about the at least one receive beam indicated by the beam indication information, the at least one receive beam used for receiving the data transmitted by the transmitting device.

When the beam indication information includes information about at least one transmit beam, the receiving device needs to determine, based on the information about the at least one transmit beam indicated by the beam indication information and a correspondence between a transmit beam and a receive beam, information about at least one receive beam corresponding to the information about the at least one transmit beam. The correspondence between a transmit beam and a receive beam is learned in advance, and the receiving device may search for the correspondence between a transmit beam and a receive beam in practice. Then, the receiving device determines, based on the information about the at least one receive beam corresponding to the information about the at least one transmit beam, the at least one receive beam used for receiving the data transmitted by the transmitting device. For example, the beam indication information includes a transmit beam 1 and a transmit beam 2, and when searching for the correspondence between a transmit beam and a receive beam, the receiving device finds that the transmit beam 1 corresponds to a receive beam a, and the transmit beam 2 corresponds to a receive beam b. Therefore, the receiving device determines to use the receive beam a to receive data transmitted by the transmit beam 1 and use the receive beam b to receive data transmitted by the transmit beam 2.

When receiving the beam indication information and the correspondence between a transmit beam and/or a receive beam and a transport layer sent by the transmitting device, the receiving device determines, according to the beam indication information and the correspondence between a transmit beam and/or a receive beam and a transport layer, the at least one receive beam used for receiving the data transmitted by the transmitting device and a transport stream received by the at least one receive beam. That is, the receiving device not only knows the receive beam used for receiving the transmitted data, but also may know a transport layer to which the transport stream received by the receive beam belongs.

The beam indication information and the correspondence between a transmit beam and/or a receive beam and a transport layer sent by the transmitting device are received by using physical layer indication signaling. A placement format and an identifying manner in the physical layer indication signaling are described in the foregoing embodiments, and are not described herein again.

Figure 5:
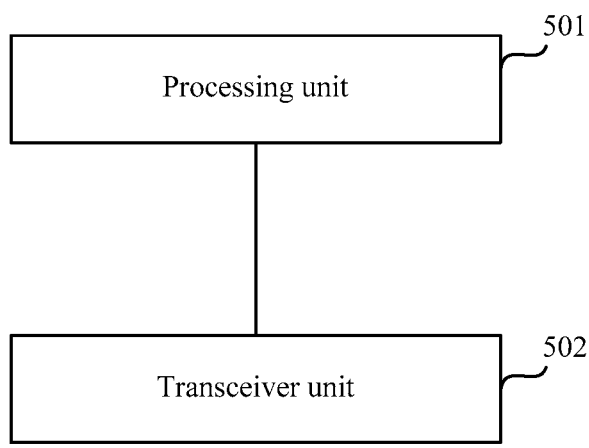
FIG. 5 is a schematic structural diagram of a transmitting device according to an embodiment of the present invention.

Based on a same technical idea, FIG. 5 shows an example of a structure of a transmitting device. The structure is applicable to a wireless communications system including a plurality of beams, and includes:

a processing unit 501, configured to determine beam indication information and at least one transmit beam used for sending data to a receiving device; and a transceiver unit 502, configured to: send the beam indication information to the receiving device; and transmit the data by using the at least one transmit beam.

Optionally, the beam indication information indicates, to the receiving device, each receive beam used for receiving the data.

Optionally, the beam indication information includes information about each receive beam or information about each transmit beam.

Optionally, the transceiver unit 502 is specifically configured to:

send QCL information to the receiving device.

Optionally, the processing unit 501 is further configured to:

determine a correspondence between the transmit beam and/or the receive beam and a transport layer after determining the beam indication information, and the transceiver unit 502 is specifically configured to:

send the beam indication information and the correspondence to the receiving device.

Optionally, the processing unit 501 is specifically configured to:

determine a correspondence between the transmit beam and/or the receive beam and a code word; and determine a mapping relationship between the code word and the transport layer, and the transceiver unit 502 is specifically configured to:

send the beam indication information and the mapping relationship between the code word and the transport layer to the receiving device.

Optionally, the transceiver unit 502 is specifically configured to:

send the beam indication information and the mapping relationship between the code word and the transport layer to the receiving device by using physical layer indication signaling, where information bits of a specified bit quantity are set in the physical layer indication signaling to indicate a quantity of transport layers to which the code word is mapped; or a specific information bit is set in the physical layer indication signaling to indicate an index value of a mapping combination of the code word and the transport layer.

Optionally, the processing unit 501 is specifically configured to:

determine the specified bit quantity based on a largest quantity of transport layers of the system; or determine the specified bit quantity based on a largest quantity of transport layers of each code word stipulated in a protocol.

Figure 6:
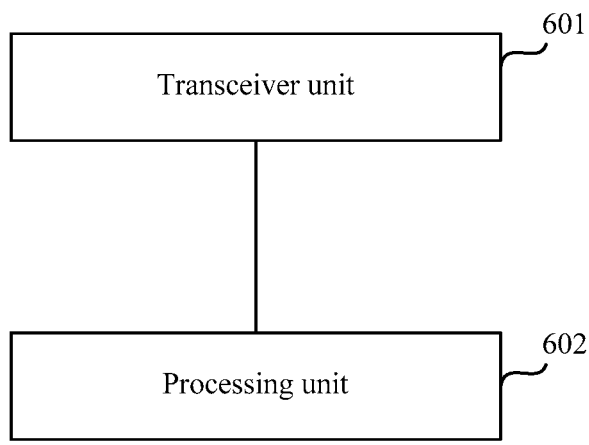
FIG. 6 is a schematic structural diagram of a receiving device according to an embodiment of the present invention.

Based on a same technical idea, FIG. 6 shows an example of a structure of a receiving device. The structure is applicable to a wireless communications system including a plurality of beams, and includes:

a transceiver unit 601, configured to receive beam indication information from a transmitting device; and a processing unit 602, configured to determine, according to the beam indication information, at least one receive beam used for receiving data transmitted by the transmitting device, and the transceiver unit 601 is further configured to receive, by using the determined at least one receive beam, the data transmitted by the transmitting device.

Optionally, the beam indication information includes information about the at least one receive beam; and the processing unit 602 is specifically configured to:

determine, based on the information about the at least one receive beam indicated by the beam indication information, the at least one receive beam used for receiving the data transmitted by the transmitting device.

Optionally, the beam indication information includes information about at least one transmit beam; and the processing unit 602 is specifically configured to:

determine, based on the information about the at least one transmit beam indicated by the beam indication information and a correspondence between a transmit beam and a receive beam, information about at least one receive beam corresponding to the information about the at least one transmit beam; and determine, based on the information about the at least one receive beam corresponding to the information about the at least one transmit beam, the at least one receive beam used for receiving the data transmitted by the transmitting device.

Optionally, the transceiver unit 601 is specifically configured to:

receive QCL information from the transmitting device; and determine, by using the processing unit 602, the beam indication information based on a correspondence between the QCL information and the beam indication information.

Optionally, the transceiver unit 601 is specifically configured to:

receive the beam indication information and a correspondence between a transmit beam and/or a receive beam and a transport layer from the transmitting device, and the processing unit 602 is specifically configured to:

determine, according to the beam indication information and the correspondence between a transmit beam and/or a receive beam and a transport layer, the at least one receive beam used for receiving the data transmitted by the transmitting device, and a transport stream that needs to be received by the at least one receive beam.

Optionally, the transceiver unit 601 is specifically configured to:

receive the beam indication information and a mapping relationship between a code word and a transport layer from the transmitting device, and the processing unit 602 is specifically configured to:

determine, according to the beam indication information and the mapping relationship between the code word and the transport layer, the at least one receive beam used for receiving the data transmitted by the transmitting device, and a transport stream that needs to be received by the at least one receive beam.

Optionally, the transceiver unit 601 is specifically configured to:

receive the beam indication information and the mapping relationship between the code word and the transport layer from the transmitting device by using physical layer indication signaling, where information bits of a specified bit quantity are set in the physical layer indication signaling to indicate a quantity of transport layers to which the code word is mapped; or a specific information bit is set in the physical layer indication signaling to indicate an index value of a mapping combination of the code word and the transport layer.

Optionally, the processing unit 602 is further configured to: determine, based on a largest quantity of transport layers of the system and the information bits of the specified bit quantity, the quantity of transport layers to which the code word is mapped; or determine, based on the information bits of the specified bit quantity, a largest quantity of transport layers of each code word stipulated in a protocol; or determine, based on the specific information bit, the index value of the mapping combination of the code word and the transport layer.

Figure 7:
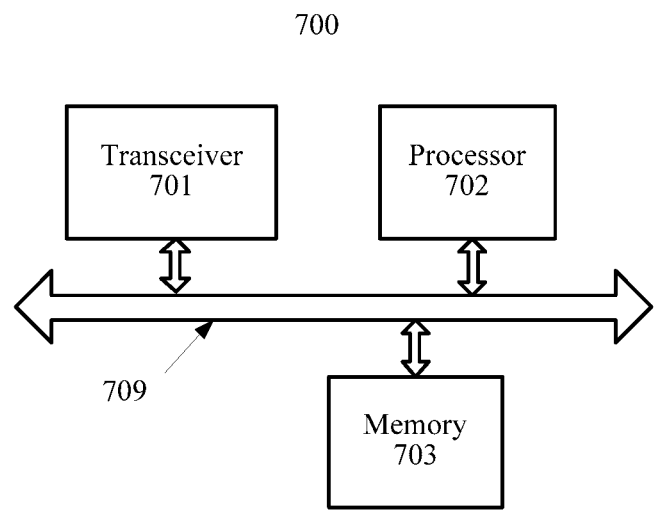
FIG. 7 is a schematic structural diagram of a transmitting device according to an embodiment of the present invention.

Based on a same idea, FIG. 7 shows a transmitting device 700 according to this application. The transmitting device 700 can perform the steps or functions performed by the transmitting device in the foregoing embodiments. The transmitting device 700 may include: a transceiver 701, a processor 702, and a memory 703. The processor 702 is configured to control an operation of the transmitting device 700. The memory 703 may include a read-only memory and a random access memory, and stores an instruction and data that can be executed by the processor 702. Various components such as the transceiver 701, the processor 702, and the memory 703 are connected by using a bus 709. In addition to a data bus, the bus 709 may include a power supply bus, a control bus, and a status signal bus. However, for clear description, various types of buses in the figure are marked as the bus 709. Certainly, the transceiver 701 and the memory 703 may also be connected to the processor 702 in another manner. The transceiver 701 may include a transmitter and a receiver.

The data transmission method disclosed in this application may be applied to the processor 702 or implemented by the processor 702.

The processor 702 is configured to read code in the memory 703 to perform a data transmission procedure.

Figure 8:
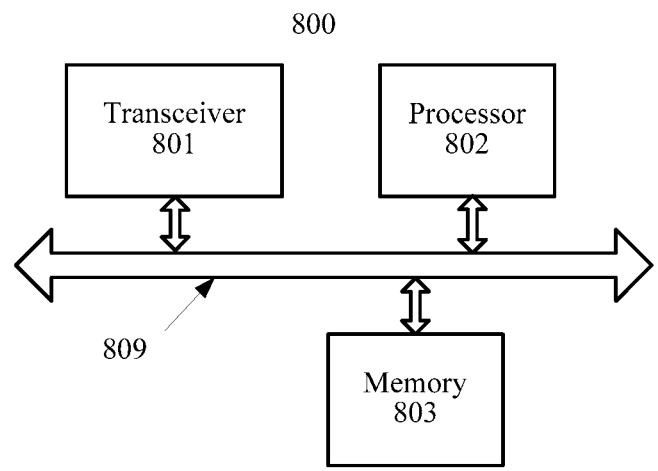
FIG. 8 is a schematic structural diagram of a receiving device according to an embodiment of the present invention.

Based on a same idea, FIG. 8 shows a receiving device 800 according to this application. The receiving device 800 can perform the steps or functions performed by the receiving device in the foregoing embodiments. The receiving device 800 may include: a transceiver 801, a processor 802, and a memory 803. The processor 802 is configured to control an operation of the receiving device 800. The memory 803 may include a read-only memory and a random access memory, and stores an instruction and data that can be executed by the processor 802. Various components such as the transceiver 801, the processor 802, and the memory 803 are connected by using a bus 809. In addition to a data bus, the bus 809 may include a power supply bus, a control bus, and a status signal bus. However, for clear description, various types of buses in the figure are marked as the bus 809. Certainly, the transceiver 801 and the memory 803 may also be connected to the processor 802 in another manner. The transceiver 801 may be a transceiver, and may include a transmitter and a receiver.

The data transmission method disclosed in this application may be applied to the processor 802 or implemented by the processor 802.

The processor 802 is configured to read code in the memory 803 to perform a data transmission procedure.

Persons skilled in the art should understand that the embodiments of the present invention may be provided as a method, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and or the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the claims and their equivalent technologies of the present invention.

What is claimed is:

1. A method comprises:
   determining, by a transmitting device, beam indication information and a plurality of transmit beams from a plurality of transmitting devices used for sending data to a receiving device, wherein the beam indication information indicates the plurality of transmit beams from the plurality of transmitting devices, and the plurality of transmitting devices are located in different locations;
   determining, by the transmitting device, a correspondence between a transport layer and at least one transmit beam of the plurality of transmit beams or at least one receive beam of a plurality of receive beams, wherein the determining the correspondence comprises
      determining, by the transmitting device, a correspondence between at least one transmit beam or the receive beam and a code word; and
      determining, by the transmitting device, a mapping relationship between the code word and the transport layer;
   determining, by the transmitting device based on a largest quantity of transport layers of a system and information bits of a specified bit quantity, a quantity of transport layers to which the code word is mapped, wherein the information bits of the specified bit quantity are set in physical layer indication signaling to indicate the quantity of transport layers to which the code word is mapped;
   sending, by the transmitting device, the beam indication information to the receiving device, wherein the sending the beam indication information to the receiving device comprises:
      sending, by the transmitting device, the beam indication information and the mapping relationship between the code word and the transport layer to the receiving device by using the physical layer indication signaling; and
   transmitting, by the transmitting device, the data by using at least one transmit beam of the plurality of transmit beams.

2. The method according to claim 1, wherein the beam indication information indicates, to the receiving device, each receive beam used for receiving the data.

3. The method according to claim 2, wherein the beam indication information comprises information about each receive beam or information about each transmit beam.

4. The method according to claim 1, wherein the sending, by the transmitting device, the beam indication information to the receiving device comprises:
   sending, by the transmitting device, quasi co-location (QCL) information to the receiving device.

5. A method comprises:
   receiving, by a receiving device, beam indication information from a transmitting device, wherein the beam indication information and a plurality of transmit beams from a plurality of transmitting devices used for sending data to the receiving device are determined by the transmitting device, and the beam indication information indicated the plurality of transmit beams from the plurality of transmitting devices, the plurality of transmitting devices are located in different locations, wherein the receiving the beam indication information comprises:
      receiving, by the receiving device, the beam indication information and a mapping relationship between a code word and a transport layer from the transmitting device by using physical layer indication signaling, wherein
         information bits of a specified bit quantity are set in the physical layer indication signaling to indicate a quantity of transport layers to which the code word is mapped, and the specified bit quantity is determined based on a largest quantity of transport layers of each code word stipulated in a protocol;
   determining, by the receiving device according to the beam indication information, at least one receive beam used for receiving data transmitted by the transmitting device, wherein the determining the at least one receive beam used for receiving data comprises:
  determining, by the receiving device according to the beam indication information and the mapping relationship between the code word and the transport layer, the at least one receive beam used for receiving the data transmitted by the transmitting device, and a data stream to be received by the at least one receive beam;
  determining, by the receiving device based on a largest quantity of transport layers of a system and the information bits of the specified bit quantity, the quantity of transport layers to which the code word is mapped; and
  receiving, by the receiving device by using the determined at least one receive beam, the data transmitted by the transmitting device.

6. The method according to claim 5, wherein the beam indication information comprises information about the at least one receive beam; and
  the determining, by the receiving device according to the beam indication information, at least one receive beam used for receiving data transmitted by the transmitting device comprises:
  determining, by the receiving device based on the information about the at least one receive beam indicated by the beam indication information, the at least one receive beam used for receiving the data transmitted by the transmitting device.

7. The method according to claim 5, wherein the beam indication information comprises information about at least one transmit beam of the plurality of transmit beams; and
  the determining, by the receiving device according to the beam indication information, at least one receive beam used for receiving data transmitted by the transmitting device comprises:
  determining, by the receiving device based on the information about the at least one transmit beam indicated by the beam indication information and a correspondence between a transmit beam and a receive beam, information about at least one receive beam corresponding to the information about the at least one transmit beam; and
  determining, by the receiving device based on the information about the at least one receive beam corresponding to the information about the at least one transmit beam, the at least one receive beam used for receiving the data transmitted by the transmitting device.

8. The method according to claim 5, wherein the receiving, by a receiving device, beam indication information from a transmitting device comprises:
  receiving, by the receiving device, quasi co-location (QCL) information from the transmitting device; and
  determining, by the receiving device, the beam indication information based on a correspondence between the QCL information and the beam indication information.

9. A transmitting device comprises:
  at least one processor;
  a transceiver;
  one or more memories coupled to the at least one processor and storing programming instructions for execution by the at least one processor to cause the transmitting device to:
  determine beam indication information and a plurality of transmit beams from a plurality of transmitting devices used for sending data to a receiving device, wherein the beam indication information indicates the plurality of transmit beams from the plurality of transmitting devices, and the plurality of transmitting devices are located in different locations;
  determine a correspondence between a transport layer and at least one transmit beam of the plurality of transmit beams or at least one receive beam of a plurality of receive beams;
  determine a correspondence between at least one transmit beam or the receive beam and a code word;
  determine a mapping relationship between the code word and the transport layer;
  determine, based on a largest quantity of transport layers of a system and information bits of a specified bit quantity, a quantity of transport layers to which the code word is mapped, wherein the information bits of the specified bit quantity are set in physical layer indication signaling to indicate the quantity of transport layers to which the code word is mapped;
  send, by using the transceiver, the beam indication information and the mapping relationship between the code word and the transport layer to the receiving device by using the physical layer indication signaling; and
  transmit, by using the transceiver, the data by using at least one transmit beam of the plurality of transmit beams.

10. The transmitting device according to claim 9, wherein the beam indication information indicates, to the receiving device, each receive beam used for receiving the data.

11. The transmitting device according to claim 10, wherein the beam indication information comprises information about each receive beam or information about each transmit beam.

12. The transmitting device according to claim 9, wherein the programming instructions, when executed by the at least one processor, cause the transmitting device to:
  control the transceiver to send quasi co-location (QCL) information to the receiving device.

* * * * *